United States Patent
Anzai et al.

(10) Patent No.: US 10,800,333 B2
(45) Date of Patent: Oct. 13, 2020

(54) VEHICLE MIRROR WITH IMAGE DISPLAY FUNCTION AND METHOD OF MANUFACTURING THE SAME

(71) Applicant: FUJIFILM Corporation, Tokyo (JP)

(72) Inventors: Akihiro Anzai, Minami-ashigara (JP); Kazuhiro Oki, Minami-ashigara (JP); Mitsuyoshi Ichihashi, Minami-ashigara (JP); Takao Taguchi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 253 days.

(21) Appl. No.: 15/834,942

(22) Filed: Dec. 7, 2017

(65) Prior Publication Data

US 2018/0105110 A1 Apr. 19, 2018

Related U.S. Application Data

(63) Continuation of application No. PCT/JP2016/066981, filed on Jun. 8, 2016.

(30) Foreign Application Priority Data

Jun. 9, 2015 (JP) .................................. 2015-116429

(51) Int. Cl.
*B60R 1/04* (2006.01)
*B60R 1/12* (2006.01)
(Continued)

(52) U.S. Cl.
CPC ................ *B60R 1/04* (2013.01); *B60R 1/083* (2013.01); *B60R 1/12* (2013.01); *G02B 5/08* (2013.01);
(Continued)

(58) Field of Classification Search
CPC .. B60R 1/04; B60R 1/083; B60R 1/12; B60R 2001/1253; G02B 5/30; G02B 5/08; G02F 1/1335; G02F 1/1333; G09F 9/00
See application file for complete search history.

(56) References Cited

U.S. PATENT DOCUMENTS

2002/0154379 A1 10/2002 Tonar et al.
2007/0279756 A1* 12/2007 Rosario ..................... B60R 1/12
359/633
(Continued)

FOREIGN PATENT DOCUMENTS

EP 2789505 A1 10/2014
GB 2406841 A 4/2005
(Continued)

OTHER PUBLICATIONS

Extended European Search Report for counterpart European Application No. 16807492.0, dated Apr. 30, 2018.
(Continued)

*Primary Examiner* — Kimberly N. Kakalec
(74) *Attorney, Agent, or Firm* — Birch, Stewart, Kolasch & Birch, LLP

(57) ABSTRACT

According to the invention, there are provided a vehicle mirror with an image display function including: an image display device; and a half mirror, in which the half mirror includes a reflection layer, and the reflection layer is inclined with respect to a surface of an image display portion of the image display device, and a method of manufacturing a vehicle mirror with an image display function including: positioning a half mirror including a reflection layer on a surface of an image display portion of an image display device such that the half mirror is inclined with respect to the surface of the image display portion. In a vehicle mirror with
(Continued)

an image display function according to the invention, image visibility is hardly reduced by outside light.

9 Claims, 6 Drawing Sheets

(51) Int. Cl.

| | | |
|---|---|---|
| *G02F 1/1335* | (2006.01) | |
| *G02B 5/30* | (2006.01) | |
| *G02F 1/1333* | (2006.01) | |
| *G02B 5/08* | (2006.01) | |
| *G09F 9/00* | (2006.01) | |
| *B60R 1/08* | (2006.01) | |

(52) U.S. Cl.
CPC ............. *G02B 5/30* (2013.01); *G02F 1/1333* (2013.01); *G02F 1/1335* (2013.01); *G09F 9/00* (2013.01); *B60R 2001/1253* (2013.01)

(56) References Cited

U.S. PATENT DOCUMENTS

| | | | | |
|---|---|---|---|---|
| 2008/0252833 | A1* | 10/2008 | Nieuwkerk | ............ B60R 1/088 349/115 |
| 2009/0135493 | A1* | 5/2009 | Takayanagi | ............... B60R 1/12 359/631 |
| 2010/0277786 | A1* | 11/2010 | Anderson | ............... B60R 1/088 359/247 |
| 2014/0232728 | A1 | 8/2014 | Eakin | |
| 2014/0300979 | A1 | 10/2014 | Tomida et al. | |
| 2014/0347488 | A1 | 11/2014 | Tazaki et al. | |
| 2015/0043083 | A1 | 2/2015 | Konuki | |
| 2015/0075069 | A1 | 3/2015 | Ichihashi et al. | |
| 2016/0026039 | A1 | 1/2016 | Sakai et al. | |
| 2016/0209651 | A1 | 7/2016 | Ichihashi et al. | |
| 2016/0209652 | A1* | 7/2016 | Ichihashi | ................. G02B 5/26 |
| 2016/0221506 | A1* | 8/2016 | Takada | .................... B60R 1/083 |

FOREIGN PATENT DOCUMENTS

| | | |
|---|---|---|
| JP | 7-318928 A | 12/1995 |
| JP | 11-125717 A | 5/1999 |
| JP | 2004-4149 A | 1/2004 |
| JP | 2013-243971 A | 12/2013 |
| JP | 2013-244753 A | 12/2013 |
| JP | 2014-201146 A | 10/2014 |
| JP | 2014-202928 A | 10/2014 |
| WO | WO 2013/084622 A1 | 6/2013 |
| WO | WO 2014/112525 A1 | 7/2014 |
| WO | WO 2015/050202 A1 | 4/2015 |

OTHER PUBLICATIONS

Japanese Notification of Reasons for Refusal for corresponding Japanese Application No. 2015-116429, dated Aug. 7, 2018, with machine translation.
International Preliminary Report on Patentability and Written Opinion of the International Searching Authority (forms PCT/IB/373, PCT/ISA/237 and PCT/IB/326), dated Dec. 21, 2017, for corresponding International Application No. PCT/JP2016/066981, with an English translation of the Written Opinion.
International Search Report (form PCT/ISA/210), dated Jul. 12, 2016, for corresponding International Application No. PCT/JP2016/066981, with an English translation.

* cited by examiner

VEHICLE MIRROR WITH IMAGE DISPLAY FUNCTION AND METHOD OF MANUFACTURING THE SAME

CROSS-REFERENCE TO RELATED APPLICATIONS

This application is a continuation of PCT International Application No. PCT/JP2016/066981 filed on Jun. 8, 2016, which claims priority under 35 U.S.0 §119 (a) to Japanese Patent Application No. 2015-116429 filed on Jun. 9, 2015, the entire content of which is incorporated herein by reference.

BACKGROUND OF THE INVENTION

1. Field of the Invention

The present invention relates to a vehicle mirror with an image display function and a method of manufacturing the vehicle mirror.

2. Description of the Related Art

In JP2014-201146A, a vehicle mirror with an image display function is described which is capable of displaying images such as images taken by a car-mounted camera on the vehicle mirror. In the vehicle mirror with an image display function disclosed in JP2014-201146A, a liquid crystal display device is provided inside a housing of the vehicle mirror to display an image through a half mirror provided on a front surface of the vehicle mirror, thereby realizing image display on the mirror.

SUMMARY OF THE INVENTION

Since the half mirror has light reflectivity, light reflected from the surface may reduce image visibility during image display in the vehicle mirror with an image display function configured to have the half mirror on the surface as described above. This problem is particularly prominent when intense light such as light from the headlights of other vehicles enters the mirror.

An object of the invention is to provide a vehicle mirror with an image display function in which image visibility is hardly reduced by outside light, and a method of manufacturing the vehicle mirror.

The inventors have conducted studies to achieve the object, and found that the influence of outside light on an image may be significantly reduced by changing the arrangement between the image display device and the half mirror used to be adhered or closely attached in parallel to each other. The inventors have conducted further intensive studies based on the above knowledge, and completed the invention.

That is, the invention provides the following [1] to [14].

[1] A vehicle mirror with an image display function comprising: an image display device; and a half mirror, in which the half mirror includes a reflection layer, and the reflection layer is inclined with respect to a surface of an image display portion of the image display device.

[2] The vehicle mirror with an image display function according to [1], in which an inclination angle of the reflection layer with respect to the surface of the image display portion is 3° to 10°.

[3] The vehicle mirror with an image display function according to [1] or [2], in which the reflection layer is a circular polarization reflection layer.

[4] The vehicle mirror with an image display function according to [3], in which the circular polarization reflection layer includes a cholesteric liquid crystal layer.

[5] The vehicle mirror with an image display function according to [4], in which the circular polarization reflection layer includes three or more cholesteric liquid crystal layers.

[6] The vehicle mirror with an image display function according to [4] or [5], further comprising: a ¼ wavelength plate, in which the vehicle mirror with an image display function includes the image display device, the ¼ wavelength plate, and the circular polarization reflection layer in this order.

[7] The vehicle mirror with an image display function according to [6], in which the circular polarization reflection layer and the ¼ wavelength plate are in direct contact with each other.

[8] The vehicle mirror with an image display function according to [3], in which the circular polarization reflection layer includes a linear polarization reflection plate and a ¼ wavelength plate from the image display device side.

[9] The vehicle mirror with an image display function according to any one of [1] to [8], in which the half mirror includes a front surface plate, and the vehicle mirror with an image display function includes the image display device, the reflection layer, and the front surface plate in this order.

[10] The vehicle mirror with an image display function according to any one of [1] to [9], in which an air layer is included between the surface of the image display portion and the half mirror.

[11] The vehicle mirror with an image display function according to any one of [1] to [9], in which an adhesive layer is included between the surface of the image display portion and the half mirror.

[12] The vehicle mirror with an image display function according to any one of [1] to [11], in which the image display device and the half mirror are integrally formed in a frame provided on side surfaces of the half mirror.

[13] A method of manufacturing a vehicle mirror with an image display function comprising: positioning a half mirror including a reflection layer on a surface of an image display portion of an image display device such that the half mirror is inclined with respect to the surface of the image display portion.

[14] The manufacturing method according to [13], further comprising: determining an angle of the inclination.

According to the invention, there are provided a vehicle mirror with an image display function in which image visibility is hardly reduced by outside light, and a method of manufacturing the vehicle mirror.

DESCRIPTION OF THE PREFERRED EMBODIMENTS

Figure 1:
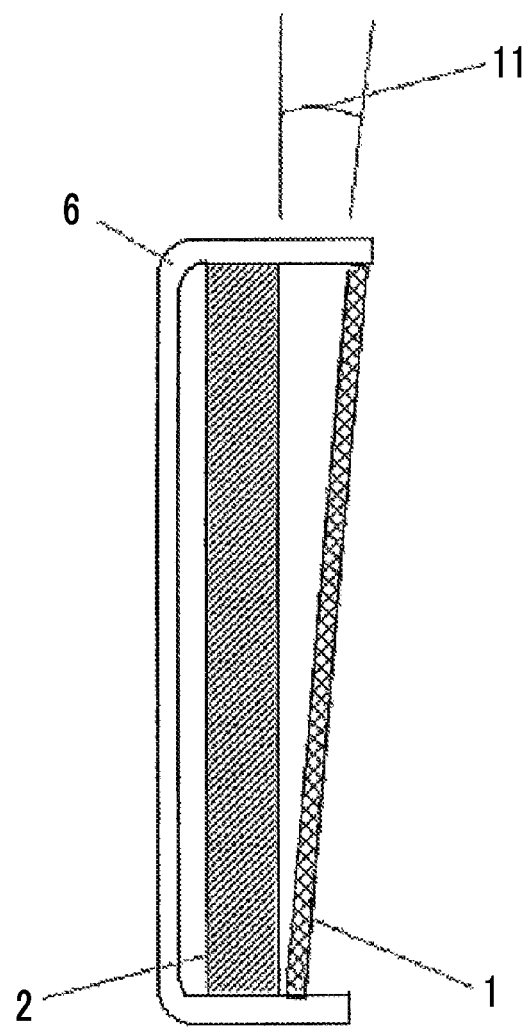
FIG. 1 is a diagram schematically illustrating a cross-section of an example of a vehicle mirror with an image display function according to the invention.

Hereinafter, the invention will be described in detail.

In this specification, "to" is used to mean that numerical values before and after "to" are included as a lower limit value and an upper limit value.

In this specification, an angle such as "45°", "parallel", "vertical", or "perpendicular" means that a difference from an exact angle is in a range less than 5 degrees unless otherwise stated. The difference from an exact angle is preferably less than 4°, and more preferably less than 3°.

In this specification, "(meth)acrylate" is used to mean "one or both of acrylate and methacrylate".

In this specification, in a case where "selectively" is used in regard to circularly polarized light, it means that the light quantity of any one of a right circular polarization component and a left circular polarization component is greater than that of the other circular polarization component. Specifically, when "selectively" is used, the circular polarization degree of light is preferably 0.3 or greater, more preferably 0.6 or greater, and even more preferably 0.8 or greater. Substantially, the circular polarization degree is yet even more preferably 1.0.

Here, the circular polarization degree is a value which is expressed by $|I_R-I_L|/(I_R+A_L)$ where the intensity of a right circular polarization component of light is represented by $I_R$, and the intensity of a left circular polarization component is represented by $I_L$.

In this specification, when "sense" is used in regard to circularly polarized light, it means that the light is either right-circularly polarized light or left-circularly polarized light. The sense of circularly polarized light is defined such that, in a case where light is viewed as it proceeds toward an observer and in a case where the tip of an electric field vector rotates clockwise with the increase in time, the light is right-circularly polarized light, and in a case where it rotates counterclockwise, the light is left-circularly polarized light.

In this specification, the term "sense" may be used in regard to a twisted direction of the helix of cholesteric liquid crystal. In a case where a twisted direction (sense) of the helix of the cholesteric liquid crystal is right-handed, the right-circularly polarized light is reflected and the left-circularly polarized light is transmitted. In a case where the sense is left-handed, the left-circularly polarized light is reflected, and the right-circularly polarized light is transmitted.

In electromagnetic rays, visible light rays are light rays in a wavelength region human's eyes can see, and refer to light in a wavelength region of 380 nm to 780 nm. Infrared rays (infrared light) are electromagnetic rays in a wavelength region which is longer than visible light rays and shorter than radio waves. In infrared rays, near-infrared light refers to electromagnetic rays in a wavelength region of 780 nm to 2500 nm.

In this specification, when "image" is used in regard to a mirror with an image display function, it means an image which can be observed by being visually recognized from a front surface side when an image display portion of an image display device displays the image. In addition, in this specification, when "mirror-reflected image" is used in regard to the mirror with an image display function, it means an image which can be observed by being visually recognized from the front surface side when the image display portion of the image display device displays no image.

In this specification, the front phase difference is a value measured using AxoScan manufactured by Axometrics, Inc. The measured wavelength is 550 nm unless otherwise stated. As the front phase difference, a value measured by making light with a wavelength in a visible light wavelength region, such as a central wavelength of selective reflection of a cholesteric liquid crystal layer, incident in a film normal direction in KOBRA 21ADH or WR (manufactured by Oji Scientific Instruments) can also be used. In the selection of the measured wavelength, a wavelength selective filter can be manually replaced, or the measured value can be converted by a program or the like for measurement.

<<Vehicle Mirror with Image Display Function>>

A vehicle mirror with an image display function can be used as, for example, a vehicle rearview mirror (inner mirror). The vehicle minor with an image display function may have a frame, a housing, a support arm for attachment to a vehicle body, and the like so as to be used as a rearview mirror. The vehicle mirror with an image display function may be formed to be mounted on a rearview minor. In the vehicle mirror with an image display function having the above shape, vertical and horizontal directions in ordinary use can be specified.

The vehicle minor with an image display function may have a plate shape or a film shape, and have a curved surface. A front surface of the vehicle minor with an image display function may be flat or curved. In a case where the vehicle minor is curved and the convex curved surface is on the front surface side, the minor can be made as a wide minor enabling visual recognition of a rear visual field in a wide angle. Such a curved front surface can be produced using a curved half mirror.

The curvature may be in a vertical direction, in a horizontal direction, or in vertical and horizontal directions. Regarding the curvature, the radius of curvature is preferably 500 mm to 3000 mm, and more preferably 1000 mm to 2500 mm. The radius of curvature is a radius of a circumscribed circle of a curved portion, assumed in cross-section.

The mirror with an image display function according to the invention includes an image display device and a half mirror.

In the mirror with an image display function, an air layer or an adhesive layer may exist between the image display device and the half mirror.

In this specification, a surface of the image display device on the half minor side may be referred to as a front surface.

In the vehicle mirror with an image display function according to the invention, a reflection layer is inclined with respect to a surface of an image display portion of the image display device. Due to such a configuration, in a case where a vehicle driver observes light for image display from the image display device, a reflecting direction of outside light entering the vehicle mirror with an image display function can be shifted to the observation direction of the driver. In this specification, "outside light" means all types of light other than light for image display in a case where the image display portion of the image display device is observed from the half mirror surface of the vehicle mirror with an image display function. Typical examples of the "outside light" include sunlight from the outside of the vehicle and light derived from headlights of other vehicles.

FIG. 1 schematically illustrates a cross-section of an example of the vehicle mirror with an image display function according to the invention. The cross-section illustrated in FIG. 1 is a cross-section of the vehicle mirror with an image display function cut in a vertical direction with a normal line of a surface of an image display portion of an image display device of the vehicle mirror with an image display function. In the vehicle mirror with an image display function illustrated in FIG. 1, a half mirror 1 is inclined with respect to the surface of the image display portion of the image display device 2. A main surface of the planar half mirror having a constant thickness is parallel to a main surface of a reflection layer as will be noted in a half mirror producing method to be described later. Accordingly, an inclination angle 11 between the surface of the image display portion of the image display device and the half mirror is the same as an inclination angle between the surface of the image display portion of the image display device and the reflection layer. In this specification, the "main surface" refers to a surface of a plate-shaped or film-shaped member (front surface, rear surface). The "side surface" refers to a surface in a thickness direction of the same member.

Figure 3:
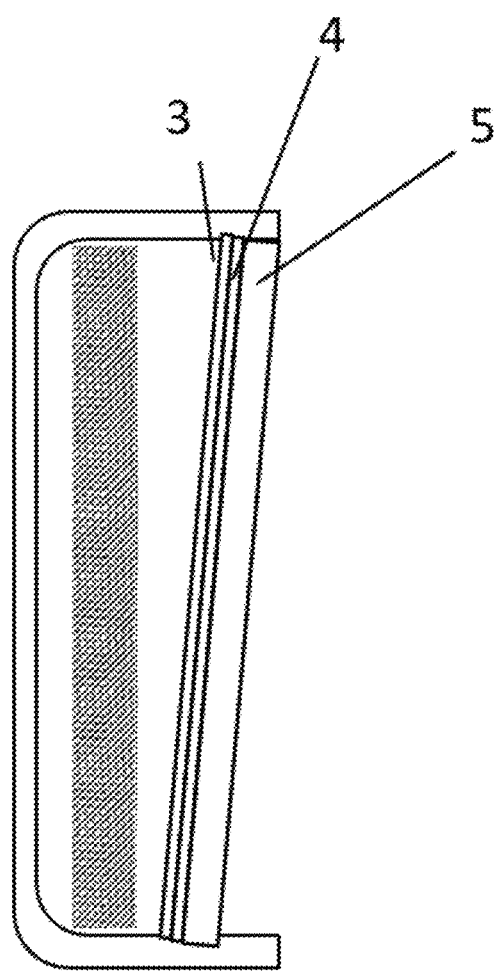
FIG. 3 is a diagram schematically illustrating a cross-section of a second example of a vehicle mirror with an image display function according to the invention.
Figure 4:
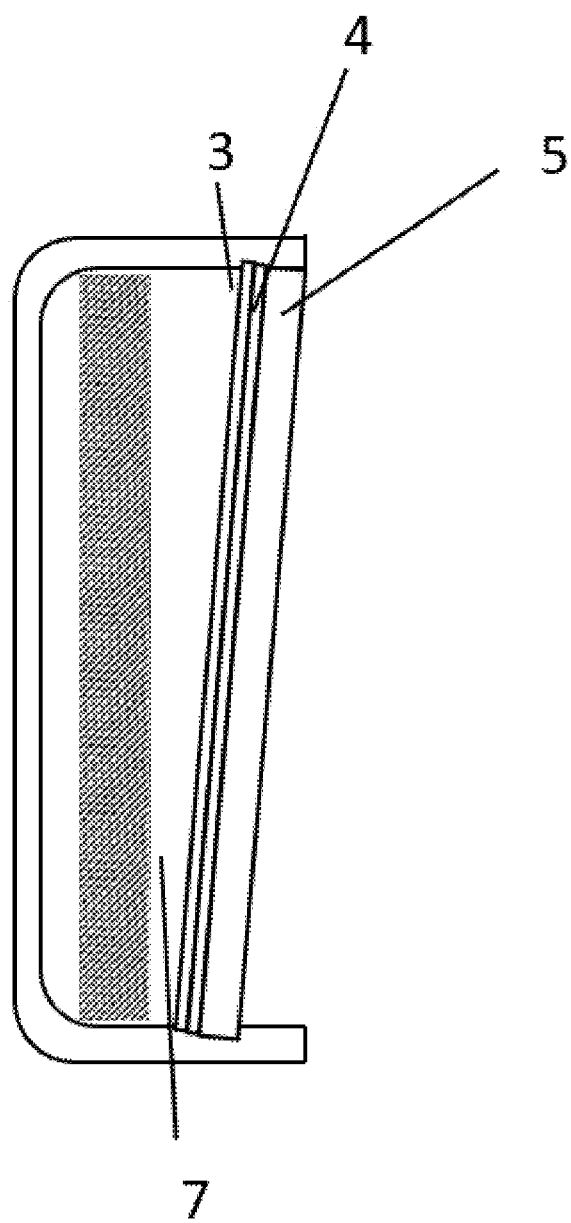
FIG. 4 is a diagram schematically illustrating a cross-section of a third example of a vehicle mirror with an image display function according to the invention.
Figure 5:
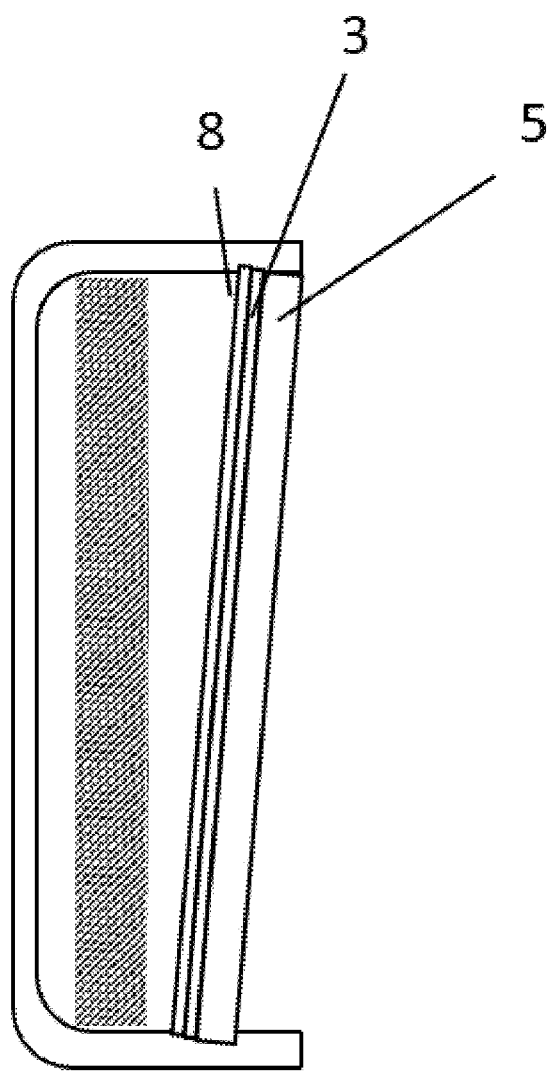
FIG. 5 is a diagram schematically illustrating a cross-section of a fourth example of a vehicle mirror with an image display function according to the invention.
Figure 6:
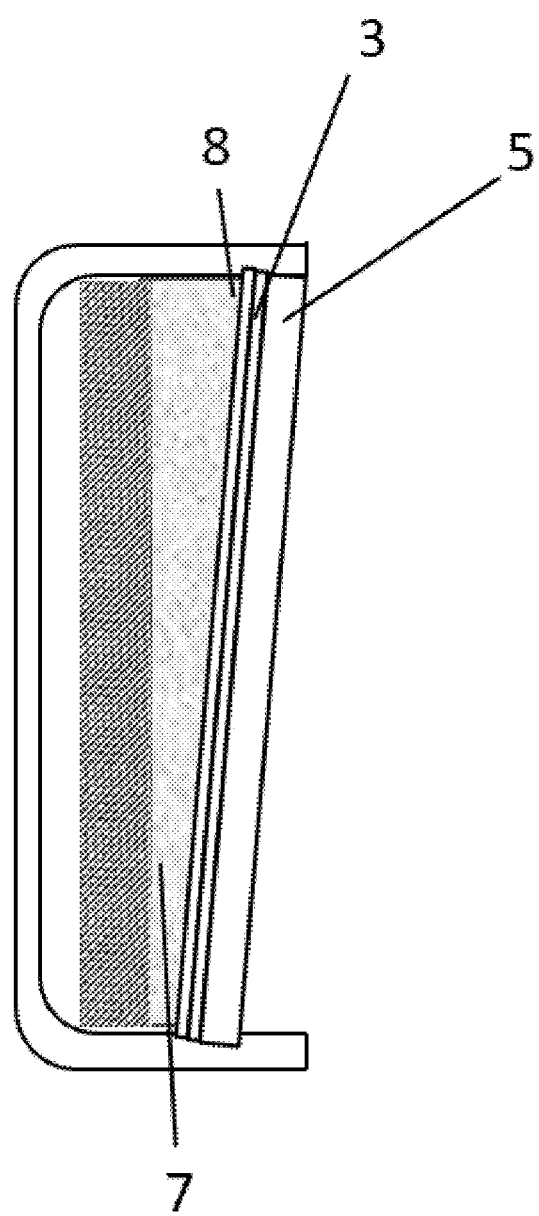
FIG. 6 is a diagram schematically illustrating a cross-section of a fifth example of a vehicle mirror with an image display function according to the invention.

The inclination angle 11 is not particularly limited, but preferably 3° to 10°, and more preferably 4° to 6°. In a vehicle mirror with an image display function having a curved mirror surface, the inclination angle 11 is more preferably 7° to 10°. The inclination angle is an angle (acute angle) formed between a tangent at the central point of the half mirror and a surface of the image display device in the cross-section cut in the vertical direction to include the center of the vehicle mirror with an image display function. FIG. 3 is based on FIG. 1 and shows a ¼ wavelength plate 3, a cholesteric liquid crystal layer 4 (circular polarization reflection layer), and a front surface plate 5, and an air layer (not shown) is included between the image display device 2 and the half mirror 1. FIG. 4 is also based on FIG. 1 and shows a ¼ wavelength plate 3, a cholesteric liquid crystal layer 4 (circular polarization reflection layer), and a front surface plate 5, and an adhesive layer 7 is included between the image display device 2 and the half mirror 1.

As illustrated in FIG. 1, in the vehicle mirror with an image display function, the reflection layer is preferably inclined with respect to the surface of the image display portion of the image display device such that a distance between the reflection layer and the surface of the image display portion of the image display device increases toward an upper part of the half mirror. Due to such a configuration, in a case where the vehicle mirror with an image display function is used as a rearview mirror (a mirror installed higher than a driver), the reflecting direction of outside light can be easily shifted to the observation direction of the driver.

In the vehicle mirror with an image display function, the inclination between the image display device and the half mirror may be variable or fixed. The image display device and the half mirror may be integrally formed in, for example, a frame which is provided on side surfaces of the half mirror.

In this specification, the "vehicle mirror with an image display function" may be simply referred to as "mirror with an image display function".

<<Image Display Device>>

The image display device is not particularly limited. The image display device is preferably an image display device which forms an image by emitting linearly polarized light, and more preferably a liquid crystal display device or an organic EL device.

The liquid crystal display device may be a transmission type or a reflection type, and is particularly preferably a transmission type. The liquid crystal display device may be a liquid crystal display device of any one of an in plane switching (IPS) mode, a fringe field switching (FFS) mode, a vertical alignment (VA) mode, an electrically controlled birefringence (ECB) mode, a super twisted nematic (STN) mode, a twisted nematic (TN) mode, an optically compensated bend (OCB) mode, and the like. During power off of the image display device, the visible light average reflectance at a wavelength of 380 nm to 780 nm is preferably 30% or greater, and more preferably 40% or greater. The reflection of visible light during power off of the image display device may be derived from the constituent members (reflective polarizing plate, backlight unit, and the like) of the image display device.

The image which is displayed on the image display portion of the image display device may be a still image, a motion picture, or simple texture information. The display may be monochrome display such as black and white display, multi-color display, or full-color display.

Preferable examples of the image which is displayed on the image display portion of the image display device include an image taken by a car-mounted camera. This image is preferably a motion picture.

In the image display device, for example, an emission peak wavelength $\lambda R$ of red light, an emission peak wavelength $\lambda G$ of green light, and an emission peak wavelength $\lambda B$ of blue light may be shown in an emission spectrum during white display. In a case where the image display device has such emission peak wavelengths, it can display a full-color image. $\lambda R$ may be any wavelength in a range of 580 to 700 nm, and preferably in a range of 610 to 680 nm. $\lambda G$ may be any wavelength in a range of 500 to 580 nm, and preferably in a range of 510 to 550 nm. $\lambda B$ may be any wavelength in a range of 400 to 500 nm, and preferably in a range of 440 to 480 nm.

<<Half Mirror>>

The half mirror may have a plate shape or a film shape, and have a curved surface. The half mirror may be flat or curved. A curved half mirror can be produced using a curved front surface plate.

The half mirror includes a reflection layer. The half mirror may include other layers such as a front surface plate or an adhesive layer. In a case where the half mirror includes a front surface plate, the area of the main surface of the front surface plate may be larger than, the same as, or smaller than the area of the main surface of the reflection layer. In this specification, the "main surface" refers to a surface of a plate-shaped or film-shaped member (front surface, rear surface). The reflection layer may be adhered to a part of the main surface of the front surface plate and another types of reflection layer such as metal foil may be adhered to or formed on the other part of the main surface. Due to such a configuration, image display on a part of the mirror is possible. The reflection layer may be adhered to the entire main surface of the front surface plate. In addition, in the mirror with an image display function, a half mirror having a main surface of the same area as the image display portion of the image display device, or a half mirror having a larger or smaller main surface area than the image display portion of the image display device may be used. By selecting from among these relationships, the ratio or position of the surface of the image display portion with respect to the entire surface of the mirror can be adjusted.

The thickness of the half mirror is not particularly limited, but preferably 100 μm to 20 mm, more preferably 200 μm to 15 mm, and even more preferably 300 μm to 10 mm.

<Reflection Layer>

As the reflection layer, a reflection layer which can function as a semi-transmissive semi-reflective layer may be used. That is, the reflection layer may function to transmit light emitted from the image display device during image display, such that an image is displayed on the front surface of the mirror with an image display function, and during no image display, the reflection layer may function to reflect at least a part of incident light in a front surface direction and transmit light reflected from the image display device, such that the front surface of the mirror with an image display function serves as a mirror.

Examples of the reflection layer include a metal layer, a linear polarization reflection layer, and a circular polarization reflection layer.

As the metal layer, it is preferable to use a metal layer in which the light transmittance in a visible light region is 30% to 70% and the light reflectance in the visible light region is 30% to 70%. In this case, the light transmittance is a total light transmittance which is measured using an integrating sphere-type light transmittance measuring device, and the light reflectance is the sum of a scattering reflectance and a normal reflectance. The direct transmittance and the normal reflectance can be measured by a spectrophotometer. Examples of the metal layer include metal layers such as aluminum and silver, and a metal layer obtained by metal vapor deposition on a polymer film which is a support may be used.

The linear polarization reflection layer and the circular polarization reflection layer will be described below.

[Linear Polarization Reflection Layer]

Examples of the linear polarization reflection layer include (i) a linear polarization reflection plate having a multi-layer structure, (ii) a polarizer including a laminate of thin films having different types of birefringence, (iii) a wire grid polarizer, (iv) a polarizing prism, and (v) a scattering anisotropic polarizing plate.

Examples of (i) the linear polarization reflection plate having a multi-layer structure include a laminate of a plurality of dielectric thin films having different refractive indices. In order to form a wavelength-selective reflection film, it is preferable that a dielectric thin film having a high refractive index and a dielectric thin film having a low refractive index are alternately laminated in a plurality of layers. However, the number of film types is not limited to two, and three or more types of film may be used. The number of layers to be laminated is preferably 2 to 20, more preferably 2 to 12, even more preferably 4 to 10, and particularly preferably 6 to 8. In a case where the number of layers to be laminated is greater than 20, production efficiency may decrease due to multi-layer vapor deposition, and the object and effect of the invention may not be achieved.

The order of laminating the dielectric thin films is not particularly limited, and can be appropriately selected in accordance with the purpose. For example, in a case where the refractive indices of films adjacent to each other are high, a film having a lower refractive index is laminated first. Inversely, in a case where the refractive indices of films adjacent to each other are low, a film having a higher refractive index is laminated first. The refractive index is determined to be high or low based on a refractive index of 1.8. The criterion for determining whether a refractive index is high or low is not absolute. Among materials having a high refractive index, there may be materials having a relatively high refractive index and materials having a relatively low refractive index, and these may be alternately used.

Examples of the material of the dielectric thin film having a high refractive index include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$, and $ZrO_2$. Among these, $Bi_2O_3$, $CeO_2$, $CeF_3$, $HfO_2$, $SiO$, $Ta_2O_5$, $TiO_2$, $Y_2O_3$, $ZnSe$, $ZnS$, and $ZrO_2$ are preferable, and among these, $SiO$, $Ta_2O_5$, $TiO_2$, $Y_2O_3$, $ZnSe$, $ZnS$, and $ZrO_2$ are particularly preferable.

Examples of the material of the dielectric thin film having a low refractive index include $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$, and $ThF_4$. Among these, $Al_2O_3$, $BiF_3$, $CaF_2$, $MgF_2$, $MgO$, $SiO_2$, and $Si_2O_3$ are preferable, and $Al_2O_3$, $CaF_2$, $MgF_2$, $MgO$, $SiO_2$, and $Si_2O_3$ are particularly preferable.

The material of the dielectric thin film is not particularly limited in terms of the atomic ratio, and can be appropriately selected in accordance with the purpose. The atomic ratio can be adjusted by changing the concentration of an atmospheric gas during the film formation.

The method of forming the dielectric thin film is not particularly limited, and can be appropriately selected in accordance with the purpose. Examples thereof include physical vapor deposition methods (PVD methods) such as ion plating, vacuum vapor deposition using ion beams, and sputtering, and chemical vapor deposition methods (CVD methods). Among these, a vacuum vapor deposition method and a sputtering method are preferable, and a sputtering method is particularly preferable.

As the sputtering method, a DC sputtering method with a high film forming rate is preferable. Moreover, in the DC sputtering method, materials having high conductivity are preferably used.

In addition, examples of the method of forming a multi-layer film through the sputtering method include (1) an one-chamber method in which films are formed alternately or sequentially from a plurality of targets in a single chamber and (2) a multi-chamber method in which films are continuously formed in a plurality of chambers. Among these, a multi-chamber method is particularly preferable from the viewpoint of productivity and prevention of contamination of the materials.

The thickness of the dielectric thin film is preferably $\lambda/16$ to $\lambda$, more preferably $\lambda/8$ to $3\lambda/4$, and even more preferably $\lambda/6$ to $3\lambda/8$ in order of optical wavelength.

Some light rays propagated in the vapor-deposited dielectric layer undergo multiple reflection for each dielectric thin film. Due to interference of the reflected light rays, only the light having a wavelength which is determined by a product of the thickness of the dielectric thin film and the optical refractive index of the film is selectively transmitted. A central transmission wavelength of the vapor-deposited dielectric layer has angle dependency with respect to the incident light, and in a case where the incident light is changed, the transmission wavelength can be changed.

As (ii) the polarizer including a laminate of thin films having different types of birefringence, for example, a polarizer described in JP1997-506837A (JP-H9-506837A) or the like can be used. Specifically, in a case where processing is performed under conditions selected to obtain a refractive index relationship, it is possible to form a polarizer by using a wide variety of materials. In general, one first material needs to have a refractive index different from that of a second material in a selected direction. The difference in the refractive index can be achieved by various methods including stretching during or after film formation, extrusion molding, or coating. Moreover, in order to coextrude two materials, the materials preferably have similar rheological characteristics (for example, melt viscosity).

As the polarizer including a laminate of thin films having different types of birefringence, commercially available products can be used, and examples thereof include DBEF (registered trade name) (manufactured by 3M Company).

(iii) The wire grid polarizer is a polarizer which transmits one component of polarized light and reflects the other component thereof by birefringence of fine metal wires.

The wire grid polarizer is obtained by periodically arranging metal wires, and is used as a polarizer mainly in a terahertz wavelength band. In order to allow the wire grids to function as a polarizer, it is necessary for the interval between wires to be sufficiently smaller than the wavelength of the incident electromagnetic waves.

In the wire grid polarizer, metal wires are arranged at the same intervals. A polarization component in a polarization direction parallel to a longitudinal direction of the metal wires is reflected from the wire grid polarizer, and a polarization component in a polarization direction perpendicular thereto is transmitted through the wire grid polarizer.

As the wire grid polarizer, commercially available products can be used, and examples thereof include a wire grid polarizing filter 50×50, NT46-636, manufactured by Edmund Optics GmbH Germany.

[Circular Polarization Reflection Layer]

Using the circular polarization reflection layer in the half mirror, incident light from the front surface side can be reflected as circularly polarized light, and thus incident light from the image display device can be transmitted as circularly polarized light. Therefore, in a mirror with an image display function using the circular polarization reflection layer, it is possible to observe a display image and a mirror-reflected image through polarizing sunglasses without depending on a direction of the mirror with an image display function.

Examples of the circular polarization reflection layer include a circular polarization reflection layer including a linear polarization reflection plate and a ¼ wavelength plate and a circular polarization reflection layer including a cholesteric liquid crystal layer (hereinafter, for distinguishing the circular polarization reflection layers, these may be referred to as "Pol $\lambda$/4 circular polarization reflection layer" and "cholesteric circular polarization reflection layer", respectively.).

[Pol $\lambda$/4 Circular Polarization Reflection Layer]

In the Pol $\lambda$/4 circular polarization reflection layer, the linear polarization reflection plate and the ¼ wavelength plate may be disposed such that the slow axis of the ¼ wavelength plate forms 45° with respect to the polarization reflection axis of the linear polarization reflection plate. The ¼ wavelength plate and the linear polarization reflection plate may be adhered with, for example, an adhesive layer. The ¼ wavelength plate and the circular polarization reflection layer are preferably laminated with the same main surface area.

In a case where the linear polarization reflection plate is disposed and used so as to be a surface close to the image display device in the Pol $\lambda$/4 circular polarization reflection layer, light for image display from the image display device can be efficiently converted into circularly polarized light and emitted from the front surface of the mirror with an image display function. In a case where the light for image display from the image display device is linearly polarized light, the polarization reflection axis of the linear polarization reflection plate may be adjusted so as to transmit the linearly polarized light.

The thickness of the Pol $\lambda$/4 circular polarization reflection layer is preferably in a range of 2.0 μm to 300 μm, and more preferably in a range of 8.0 μm to 200 μm.

As the linear polarization reflection plate, those described above as a linear polarization reflection plate can be used.

As the ¼ wavelength plate, a ¼ wavelength plate to be described later can be used.

[Cholesteric Circular Polarization Reflection Layer]

The cholesteric circular polarization reflection layer includes at least one cholesteric liquid crystal layer. The cholesteric liquid crystal layer included in the cholesteric circular polarization reflection layer may exhibit selective reflection in a visible light region.

The circular polarization reflection layer may include two or more cholesteric liquid crystal layers, and may further include other layers such as an alignment layer. The circular polarization reflection layer preferably consists only of a cholesteric liquid crystal layer. In a case where the circular polarization reflection layer includes a plurality of cholesteric liquid crystal layers, these are preferably in direct contact with an adjacent cholesteric liquid crystal layer. The circular polarization reflection layer preferably includes three or more cholesteric liquid crystal layers.

The thickness of the cholesteric circular polarization reflection layer is preferably in a range of 2.0 μm to 300 μm, and more preferably in a range of 8.0 μm to 200 μm.

In this specification, the cholesteric liquid crystal layer means a layer in which a cholesteric liquid crystalline phase is fixed. The cholesteric liquid crystal layer may be simply referred to as a liquid crystal layer.

The cholesteric liquid crystalline phase has been known to exhibit circularly polarized light selective reflection in which circularly polarized light of any one sense of either right-circularly polarized light or left-circularly polarized light is selectively reflected and circularly polarized light of the other sense is selectively transmitted in a specific wavelength region. In this specification, the circularly polarized light selective reflection may be simply referred to as selective reflection.

As a film including a layer in which a cholesteric liquid crystalline phase exhibiting circularly polarized light selective reflectivity is fixed, many films formed from a composition containing a polymerizable liquid crystal compound have been known, and regarding the cholesteric liquid crystal layer, the related arts can be referred to.

The cholesteric liquid crystal layer may be a layer in which alignment of a liquid crystal compound in a cholesteric liquid crystalline phase is held. Typically, the cholesteric liquid crystal layer may be a layer obtained in such a manner that a polymerizable liquid crystal compound is allowed to be in an alignment state of a cholesteric liquid crystalline phase, and polymerized and cured by ultraviolet irradiation, heating, and the like to form a layer having no fluidity, and at the same time, the layer is changed such that the form of alignment is not changed by an external field or an external force. In the cholesteric liquid crystal layer, the optical properties of the cholesteric liquid crystalline phase just need to be held in the layer, and the liquid crystal compound in the layer may not exhibit liquid crystallinity. For example, the molecular weight of the polymerizable liquid crystal compound may be increased by a curing reaction, and the liquid crystallinity may be lost.

A central wavelength $\lambda$ of selective reflection of the cholesteric liquid crystal layer depends on a pitch P (periodicity of helix) of a helical structure in a cholesteric phase, and has a relationship of $\lambda = n \times P$ with an average refractive index n of the cholesteric liquid crystal layer. The central wavelength of selective reflection of the cholesteric liquid crystal layer and the half-width can be obtained as follows.

A reducing peak of the transmittance is shown in a selective reflection region in a case where the transmission spectrum of a light reflecting layer (measured in a normal direction of a cholesteric liquid crystal layer) is measured using a spectrophotometer UV3150 (Shimadzu Corporation). In two wavelengths corresponding to transmittances at half of the highest peak height, in a case where the value of the short-wave side wavelength is represented by $\lambda 1$ (nm) and the value of the long-wave side wavelength is represented by $\lambda 2$ (nm), the central wavelength of selective reflection and the half-width can be expressed by the following formulae.

Central Wavelength of Selective Reflection=$(\lambda 1+\lambda 2)/2$

Half-Width=$(\lambda 2-\lambda 1)$

The central wavelength $\lambda$ of selective reflection of the cholesteric liquid crystal layer, obtained as described above, generally coincides with a wavelength at a centroid position of a reflection peak of a circular polarization reflection spectrum measured in the normal direction of the cholesteric liquid crystal layer. In this specification, the central wavelength of selective reflection means a central wavelength when measured in the normal direction of the cholesteric liquid crystal layer.

As is obvious from the above formula, the central wavelength of selective reflection can be adjusted by adjusting the pitch of the helical structure. By adjusting the n value and the P value, any one of right-circularly polarized light and left-circularly polarized light is selectively reflected with respect to light with a desired wavelength, and thus the central wavelength $\lambda$ can be adjusted.

In a case where light is obliquely incident on the cholesteric liquid crystal layer, the central wavelength of selective reflection shifts to the short wavelength side. Therefore, with respect to the wavelength of selective reflection necessary for image display, $n \times P$ is preferably adjusted such that $\lambda$ calculated in accordance with the above formula $\lambda = n \times P$ becomes a long wavelength. In a case where the central wavelength of selective reflection when light rays pass through a cholesteric liquid crystal layer with a refractive index $n_2$ in a normal direction of the cholesteric liquid crystal layer (a helical axis direction of the cholesteric liquid crystal layer) at an angle of $\theta_2$ is represented by $\lambda_d$, $\lambda_d$ is expressed by the following formula.

$\lambda_d = n_2 \times P \times \cos \theta_2$

In a case where the central wavelength of selective reflection of the cholesteric liquid crystal layer included in the circular polarization reflection layer is designed in consideration of the above description, the reduction in image visibility in an oblique direction can be prevented. In addition, the image visibility in an oblique direction can be intentionally reduced. This is useful since peeping can be prevented in, for example, smartphones and personal computers. In addition, in the mirror with an image display function according to the invention, resulting from the above-described selective reflection property, a tint may appear on images and mirror-reflected images viewed in an oblique direction. The tint can be prevented from appearing in a case where the circular polarization reflection layer includes a cholesteric liquid crystal layer having a central wavelength of selective reflection in an infrared light region. In this case, the central wavelength of selective reflection of the infrared light region may be specifically 780 to 900 nm, and preferably 780 to 850 nm.

In a case where a cholesteric liquid crystal layer having a central wavelength of selective reflection is provided in an infrared light region, all cholesteric liquid crystal layers having a central wavelength of selective reflection in a visible light region are preferably closest to the image display device side.

Since the pitch of the cholesteric liquid crystalline phase depends on the type or the concentration of a chiral agent which is used together with the polymerizable liquid crystal compound, a desired pitch can be obtained by adjusting the type or the concentration. Furthermore, methods described in "Introduction to Liquid Crystal Chemical Test", p. 46, edited by Japan Liquid Crystal Society, published by Sigma Publications, 2007, and "Liquid Crystal Handbook", p. 196, Liquid Crystal Handbook Editing Committee Maruzen can be used as a method of measuring the sense or the pitch of the helix.

In the mirror with an image display function according to the invention, the circular polarization reflection layer preferably includes a cholesteric liquid crystal layer having a central wavelength of selective reflection in a red light wavelength region, a cholesteric liquid crystal layer having a central wavelength of selective reflection in a green light wavelength region, and a cholesteric liquid crystal layer having a central wavelength of selective reflection in a blue light wavelength region. The reflection layer preferably includes, for example, a cholesteric liquid crystal layer having a central wavelength of selective reflection in 400 nm to 500 nm, a cholesteric liquid crystal layer having a central wavelength of selective reflection in 500 nm to 580 nm, and a cholesteric liquid crystal layer having a central wavelength of selective reflection in 580 nm to 700 nm.

In a case where the circular polarization reflection layer includes a plurality of cholesteric liquid crystal layers, a cholesteric liquid crystal layer closer to the image display device preferably has a longer central wavelength of selective reflection. Due to such a configuration, a tint appearing in an oblique direction on an image can be suppressed.

Particularly, in a mirror with an image display function which uses a cholesteric circular polarization reflection layer including no ¼ wavelength plate, the central wavelength of selective reflection of each cholesteric liquid crystal layer is preferably different from the emission peak wavelength of the image display device by 5 nm or greater. This difference is more preferably 10 nm or greater. By shifting the central wavelength of selective reflection and the emission peak wavelength for image display of the image display device from each other, a display image can be made bright without reflection of light for image display by the cholesteric liquid crystal layer. The emission peak wavelength of the image display device can be confirmed in an emission spectrum during white display of the image display device. The peak wavelength may be a peak wavelength in a visible light region of the emission spectrum, and may be, for example, one or more selected from the group consisting of the emission peak wavelength $\lambda R$ of red light, the emission peak wavelength $\lambda G$ of green light, and the emission peak wavelength $\lambda B$ of blue light of the image display device which have been described above. The central wavelength of selective reflection of the cholesteric liquid crystal layer is preferably different from any of the emission peak wavelength $\lambda R$ of red light, the emission peak wavelength $\lambda G$ of green light, and the emission peak wavelength λB of blue light of the image display device which have been described above by 5 nm or greater, and more preferably by 10 nm or greater. In a case where the circular polarization reflection layer includes a plurality of cholesteric liquid crystal layers, the central wavelength of selective reflection of all of the cholesteric liquid crystal layers may be different from the peak wavelength of the light emitted from the image display device by 5 nm or greater, and preferably by 10 nm or greater. For example, in a case where the image display device is a full-color display device in which an emission peak wavelength λR of red light, an emission peak wavelength λG of green light, and an emission peak wavelength λB of blue light are shown in an emission spectrum during white display, the central wavelength of selective reflection of all of the cholesteric liquid crystal layers may be different from any of λR, λG, and λB by 5 nm or greater, and preferably by 10 nm or greater.

In a case where the central wavelength of selective reflection of the cholesteric liquid crystal layer to be used is adjusted in accordance with the light emitting wavelength region of the image display device and the use mode of the circular polarization reflection layer, a bright image can be displayed with high light utilization efficiency. Examples of the use mode of the circular polarization reflection layer include an incidence angle of light on the circular polarization reflection layer and an image observation direction.

As each cholesteric liquid crystal layer, a cholesteric liquid crystal layer in which the sense of the helix is right-handed or left-handed is used. The sense of the reflected circularly polarized light of the cholesteric liquid crystal layer is identical to the sense of the helix. In a case where a plurality of cholesteric liquid crystal layers are included, the senses of the helices thereof may be the same as or different from each other. That is, cholesteric liquid crystal layers in which the helical sense is either right-handed or left-handed may be included, or cholesteric liquid crystal layers in which the helical sense is right-handed and cholesteric liquid crystal layers in which the helical sense is left-handed may be included. However, in a mirror with an image display function including a ¼ wavelength plate, a plurality of cholesteric liquid crystal layers preferably have the same sense of the helix. In that case, as for each cholesteric liquid crystal layer, the sense of the helix may be determined in accordance with the sense of circularly polarized light of a sense obtained by emission from the image display device and transmission through the ¼ wavelength plate. Specifically, a cholesteric liquid crystal layer having a sense of a helix which transmits circularly polarized light of a sense obtained by emission from the image display device and transmission through the ¼ wavelength plate may be used.

A half-width Δλ (nm) of a selective reflection band in which selective reflection is exhibited depends on the birefringence Δn of the liquid crystal compound and the pitch P, and has a relationship of Δλ=Δn×P therewith. Therefore, the width of the selective reflection band can be controlled by adjusting Δn. Δn can be adjusted by adjusting the type or the mixing ratio of the polymerizable liquid crystal compound or controlling the temperature at the time of alignment fixing.

In order to form one type of cholesteric liquid crystal layers having the same central wavelength of selective reflection, a plurality of cholesteric liquid crystal layers having the same pitch P and the same sense of the helix may be laminated. By laminating cholesteric liquid crystal layers having the same pitch P and the same sense of the helix, circular polarization selectivity can be increased at a specific wavelength.

(¼ Wavelength Plate)

The mirror with an image display function using the cholesteric circular polarization reflection layer may further include a ¼ wavelength plate.

In a case where a ¼ wavelength plate is included between the image display device and the cholesteric circular polarization reflection layer, particularly, the light from the image display device which displays an image with linearly polarized light can be converted into circularly polarized light and allowed to incident on the cholesteric circular polarization reflection layer. Therefore, the light reflected by the circular polarization reflection layer and returning to the image display device side can be significantly reduced, and a bright image can be displayed. In addition, with the use of the ¼ wavelength plate, a configuration can be made in which circularly polarized light of a sense that is reflected to the image display device side is not generated in the cholesteric circular polarization reflection layer, and thus a reduction in the image display quality caused by multiple reflections between the image display device and the half mirror hardly occurs.

That is, for example, even in a case where the central wavelength of selective reflection of the cholesteric liquid crystal layer included in the cholesteric circular polarization reflection layer is substantially the same as the emission peak wavelength of blue light in an emission spectrum during white display of the image display device (the difference therebetween is, for example, less than 5 nm), the light emitted from the image display device can be transmitted to the front surface side without generation of circularly polarized light of a sense that is reflected to the image display side in the circular polarization reflection layer.

In a case where the ¼ wavelength plate which is used in combination with the cholesteric circular polarization reflection layer is adhered to the image display device, the angle of the ¼ wavelength plate is preferably adjusted such that the image is made brightest. That is, particularly, in order to allow linearly polarized light to be most satisfactorily transmitted through the image display device which displays an image with linearly polarized light, the relationship between a polarization direction (transmission axis) of the linearly polarized light and a slow axis of the ¼ wavelength plate is preferably adjusted. For example, in a case of a single layer-type ¼ wavelength plate, the transmission axis and the slow axis preferably form an angle of 45°. The light emitted from the image display device which displays an image with linearly polarized light is transmitted through the ¼ wavelength plate, and then becomes circularly polarized light of any one of right sense and left sense. The circular polarization reflection layer may be composed of a cholesteric liquid crystal layer having a twisted direction in which the circularly polarized light of the above-described sense is transmitted.

The ¼ wavelength plate may be a retardation layer which functions as a ¼ wavelength plate in a visible light region. Examples of the ¼ wavelength plate include a single layer-type ¼ wavelength plate and a broadband ¼ wavelength plate in which a ¼ wavelength plate and a ½ wavelength retardation plate are laminated.

The front phase difference of the former ¼ wavelength plate may be ¼ of the light emission wavelength of the image display device. Therefore, as the ¼ wavelength plate, a retardation layer which exhibits inverse dispersibility such that for example, in a case where the light emission wavelength of the image display device is 450 nm, 530 nm, or 640 nm, the front phase difference is 112.5 nm±10 nm, preferably 112.5 nm±5 nm, and more preferably 112.5 nm with a wavelength of 450 nm, the front phase difference is 132.5 nm±10 nm, preferably 132.5 nm±5 nm, and more preferably 132.5 nm with a wavelength of 530 nm, and the front phase difference is 160 nm±10 nm, preferably 160 nm±5 nm, and more preferably 160 nm with a wavelength of 640 nm is most preferable. However, a retardation plate which exhibits small wavelength dispersibility of phase difference or a retardation plate which exhibits forward dispersibility can also be used. The inverse dispersibility means a property that as the longer the wavelength, the larger the absolute value of the phase difference. The forward dispersibility means a property that as the shorter the wavelength, the larger the absolute value of the phase difference.

In the lamination-type ¼ wavelength plate, the ¼ wavelength plate and the ½ wavelength retardation plate are bonded such that an angle of a slow axis thereof is 60°, and thus the ½ wavelength retardation plate side is disposed on the side on which linearly polarized light is incident, and the slow axis of the ½ wavelength retardation plate intersects with the polarization surface of the incident linearly polarized light by 15° or 75°. Since the lamination-type ¼ wavelength plate exhibits good inverse dispersibility of phase difference, it can be suitably used.

The ¼ wavelength plate is not particularly limited, and can be appropriately selected in accordance with the purpose. Examples thereof include a quartz plate, a stretched polycarbonate film, a stretched norbornene-based polymer film, a transparent film containing aligned inorganic grains having birefringence such as strontium carbonate, and a thin film in which an inorganic dielectric material is obliquely vapor-deposited on a support.

Examples of the ¼ wavelength plate include (1) a retardation plate described in JP1993-27118A (JP-H5-27118A) and JP1993-27119A (JP-H5-27119A) in which a birefringent film having large retardation and a birefringent film having small retardation are laminated such that optical axes thereof are perpendicular to each other, (2) a retardation plate described in JP1998-68816A (JP-H10-68816A) in which a polymer film having a ¼ wavelength at a specific wavelength and a polymer film made of the same material as the former polymer film and having a ½ wavelength at the same wavelength are laminated to obtain a ¼ wavelength in a wide wavelength range, (3) a retardation plate described in JP1998-90521 (JP-H10-90521), capable of achieving a ¼ wavelength in a wide wavelength range by laminating two polymer films, (4) a retardation film capable of achieving a ¼ wavelength in a wide wavelength range by using a modified polycarbonate film described in WO00/26705A, and (5) a retardation plate capable of achieving a ¼ wavelength in a wide wavelength range by using a cellulose acetate film described in WO00/65384A.

A commercially available product can also be used as the ¼ wavelength plate. Examples of the commercially available product include PURE-ACE (registered trade name) WR (polycarbonate film manufactured by TEIJIN LIMITED).

The ¼ wavelength plate may be formed by arranging and fixing a polymerizable liquid crystal compound and a polymer liquid crystal compound. For example, the ¼ wavelength plate can be formed by coating a temporary support, an alignment film, or a surface of the front surface plate with a liquid crystal composition, forming the polymerizable liquid crystal compound in the liquid crystal composition in a nematic alignment in a liquid crystal state, and then fixing the alignment by photo-crosslinking or thermal crosslinking. Details of the liquid crystal composition or the producing method thereof will be described later. The ¼ wavelength plate may be a layer which is obtained by coating a temporary support, an alignment film, or a surface of the front surface plate with a liquid crystal composition containing a polymer liquid crystal compound, forming the compound in a nematic alignment in a liquid crystal state, and then fixing the alignment by cooling.

The ¼ wavelength plate and the cholesteric circular polarization reflection layer may be adhered with an adhesive layer, or in direct contact with each other, and the latter case is preferable.

(Method of Producing Cholesteric Liquid Crystal Layer and ¼ Wavelength Plate Formed from Liquid Crystal Composition)

Hereinafter, materials and methods for producing the cholesteric liquid crystal layer and the ¼ wavelength plate formed from a liquid crystal composition will be described.

Examples of the material used to form the ¼ wavelength plate include a liquid crystal composition containing a polymerizable liquid crystal compound. Examples of the material used to form the cholesteric liquid crystal layer include a liquid crystal composition further containing a chiral agent (optically active compound). The liquid crystal composition which is further mixed with a surfactant, a polymerization initiator, or the like if necessary and dissolved in a solvent or the like is coated on a temporary support, a support, an alignment film, a cholesteric liquid crystal layer serving as an underlayer, or the like, and after alignment and maturing, the liquid crystal composition is cured for fixing to form the cholesteric liquid crystal layer or the ¼ wavelength plate.

Polymerizable Liquid Crystal Compound

A rod-like liquid crystal compound may be used as the polymerizable liquid crystal compound.

Examples of the rod-like polymerizable liquid crystal compound include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans, and alkenylcyclohexyl benzonitriles are preferably used. It is possible to use not only a low-molecular liquid crystal compound, but also a polymer liquid crystal compound.

The polymerizable liquid crystal compound is obtained by introducing a polymerizable group in a liquid crystal compound. Examples of the polymerizable group include an unsaturated polymerizable group, an epoxy group, and an aziridinyl group. An unsaturated polymerizable group is preferable, and an ethylenically unsaturated polymerizable group is particularly preferable. The polymerizable group can be introduced in molecules of a liquid crystal compound by various methods. The number of the polymerizable groups in the polymerizable liquid crystal compound is preferably 1 to 6, and more preferably 1 to 3. Examples of the polymerizable liquid crystal compound include those described in Makromol. Chem., vol. 190, p. 2255 (1989), Advanced Materials, vol. 5, p. 107 (1993), U.S. Pat. No. 4,683,327A, U.S. Pat. No. 5,622,648A, U.S. Pat. No. 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more types of polymerizable liquid crystal compounds may be used in combination. Using two or more types of polymerizable liquid crystal compounds in combination may contribute to lowering the alignment temperature.

The amount of the polymerizable liquid crystal compound added in the liquid crystal composition is preferably 80 to 99.9 mass %, more preferably 85 to 99.5 mass %, and particularly preferably 90 to 99 mass % with respect to the solid content mass of the liquid crystal composition (mass excluding the mass of the solvent).

Chiral Agent: Optically Active Compound

The material used to form the cholesteric liquid crystal layer preferably contains a chiral agent. The chiral agent functions to induce the helical structure of the cholesteric liquid crystalline phase. The chiral compound may be selected in accordance with the purpose since compounds are different in the helix pitch or the sense of the helix to be induced.

The chiral agent is not particularly limited, and a known compound can be used. Examples of the chiral agent include compounds described in Liquid Crystal Device Handbook (Third Chapter, Section 4-3, Chiral Agent for TN or STN, p. 199, edited by No. 142 Committee of Japan Society for the Promotion of Science, in 1989), JP2003-287623A, JP2002-302487A, JP2002-80478A, JP2002-80851A, JP2010-181852A, or JP2014-034581A.

In general, the chiral agent contains asymmetric carbon atoms. However, an axial asymmetric compound or a planar asymmetric compound containing no asymmetric carbon atoms can also be used as a chiral agent. Examples of the axial asymmetric compound or the planar asymmetric compound include binaphthyl, helicene, paracyclophane, and their derivatives. The chiral agent may have a polymerizable group. In a case where all of the chiral agent and the liquid crystal compound have a polymerizable group, the polymerization reaction of the polymerizable chiral agent and the polymerizable liquid crystal compound can give a polymer having a repeating unit derived from the polymerizable liquid crystal compound and a repeating unit derived from the chiral compound. In this embodiment, the polymerizable group of the polymerizable chiral agent is preferably the same type as the polymerizable group of the polymerizable liquid crystal compound. Accordingly, the polymerizable group of the chiral agent is also preferably an unsaturated polymerizable group, an epoxy group, or an aziridinyl group, more preferably an unsaturated polymerizable group, and particularly preferably an ethylenically unsaturated polymerizable group.

The chiral agent may be a liquid crystal compound.

As the chiral agent, an isosorbide derivative, an isomannide derivative, or a binaphthyl derivative can be preferably used. As an isosorbide derivative, a commercially available product such as LC-756 manufactured by BASF SE may be used.

The content of the chiral agent in the liquid crystal composition is preferably 0.01 mol % to 200 mol %, and more preferably 1.0 mol % to 30 mol % with respect to the total molar amount of the polymerizable liquid crystal compound.

Polymerization Initiator

The liquid crystal composition preferably contains a polymerization initiator. In an embodiment in which a polymerization reaction is carried out by ultraviolet irradiation, a polymerization initiator to be used is preferably a photopolymerization initiator capable of initiating a polymerization reaction by ultraviolet irradiation. Examples of the photopolymerization initiator include a-carbonyl compounds (described in U.S. Pat. No. 2,367,661A and U.S. Pat. No. 2,367,670A), acyloin ethers (described in U.S. Pat. No. 2,448,828A), a-hydrocarbon-substituted aromatic acyloin compounds (described in U.S. Pat. No. 2,722,512A), polynuclear quinone compounds (described in U.S. Pat. No. 3,046,127A and U.S. Pat. No. 2,951,758A), combination of triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), acylphosphine oxide compounds (described in JP1988-40799B (JP-S63-40799B), JP1993-29234B (JP-115-29234B), JP1998-95788A (JP-H10-95788A), and JP1998-29997A (JP-H10-29997A)), oxime compounds (described in JP1988-40799B (JP-S63-40799B), JP1993-29234B (JP-H5-29234B), JP1998-95788A (JP-H10-95788A), JP1998-29997A (JP-H10-29997A)), JP2001-233842A, JP2000-80068A, JP2006-342166A, JP2013-114249A, JP2014-137466A, JP4223071B, JP2010-262028A, and JP2014-500852A), and oxadiazole compounds (described in U.S. Pat. No. 4,212,970A). For example, the description in paragraphs 0500 to 0547 of JP2012-208494A can also be referred to.

An acylphosphine oxide compound or an oxime compound is also preferably used as the polymerization initiator.

As the acylphosphine oxide compound, for example, a commercially available product IRGACURE 819 manufactured by BASF JAPAN (compound name: bis(2,4,6-trimethylbenzoyl)-phenylphosphine oxide) can be used. As the oxime compound, commercially available products such as IRGACURE OXE01 (manufactured by BASF SE), IRGACURE OXE02 (manufactured by BASF SE), TR-PBG-304 (manufactured by Changzhou Tronly New Electronic Materials CO., LTD), ADEKA ARKLS NCI-831, and ADEKA ARKLS NCI-930 (manufactured by ADEKA Corporation) can be used.

The polymerization initiators may be used alone or in combination of two or more types thereof.

The content of the photopolymerization initiator in the liquid crystal composition is preferably 0.1 to 20 mass %, and more preferably 0.5 mass % to 5.0 mass % with respect to the content of the polymerizable liquid crystal compound.

Crosslinking Agent

The liquid crystal composition may contain an arbitrary crosslinking agent in order to improve the film hardness after curing and durability. As the crosslinking agent, a material which is curable with ultraviolet rays, heat, moisture, or the like can be suitably used.

The crosslinking agent is not particularly limited, and can be appropriately selected in accordance with the purpose. Examples thereof include polyfunctional acrylate compounds such as trimethylolpropane tri(meth)acrylate and pentaerythritol tri(meth)acrylate; epoxy compounds such as glycidyl(meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group in a side chain; and alkoxysilane compounds such as vinyltrimethoxysilane and N-(2-aminoethyl) 3-aminopropyltrimethoxysilane. A known catalyst can be used depending on the reactivity of the crosslinking agent in order to enhance productivity in addition to the enhancement of the film hardness and the durability. These may be used alone or in combination of two or more types thereof.

The content of the crosslinking agent is preferably 3.0 mass % to 20 mass %, and more preferably 5.0 mass % to 15 mass %. In a case where the content of the crosslinking agent is 3.0 mass % or greater, the crosslinking density improving effect can be obtained. In addition, in a case where the content of the crosslinking agent is 20 mass % or less, the stability of a layer to be formed can be maintained.

Alignment Control Agent

In the liquid crystal composition, an alignment control agent may be added to contribute to stable or rapid planar alignment. Examples of the alignment control agent include fluorine (meth)acrylate-based polymers described in paragraphs [0018] to [0043] in JP2007-272185A and compounds represented by Formulae (I) to (IV) described in paragraphs [0031] to [0034] in JP2012-203237A.

The alignment control agents may be used alone or in combination of two or more types thereof.

The amount of the alignment control agent added in the liquid crystal composition is preferably 0.01 mass % to 10 mass %, more preferably 0.01 mass % to 5.0 mass %, and particularly preferably 0.02 mass % to 1.0 mass % with respect to the total mass of the polymerizable liquid crystal compound.

Other Additives

The liquid crystal composition may contain at least one selected from various additives such as a surfactant for uniformizing the film thickness by adjusting the surface tension of the coating film and a polymerizable monomer. Furthermore, if necessary, within a range that does not deteriorate the optical performance, a polymerization inhibitor, an antioxidant, an ultraviolet absorber, a light stabilizer, a coloring material, metal oxide particles, and the like can be added to the liquid crystal composition.

Solvent

The solvent used to prepare the liquid crystal composition is not particularly limited, and can be appropriately selected in accordance with the purpose. An organic solvent is preferably used.

The organic solvent is not particularly limited, and can be appropriately selected in accordance with the purpose. Examples thereof include ketones, alkyl halides, amides, sulfoxides, heterocyclic compounds, hydrocarbons, esters, and ethers. These may be used alone or in combination of two or more types thereof. Among these, ketones are particularly preferable in consideration of the load imposed on the environment.

Coating, Alignment, and Polymerization

The method of coating a temporary support, an alignment film, a ¼ wavelength plate, a cholesteric liquid crystal layer serving as an underlayer, or the like with a liquid crystal composition is not particularly limited, and can be appropriately selected in accordance with the purpose. Examples thereof include a wire bar coating method, a curtain coating method, an extrusion coating method, a direct gravure coating method, a reverse gravure coating method, a die-coating method, a spin coating method, a dip coating method, a spray coating method, and a slide coating method. Furthermore, the coating can also be performed by transferring a liquid crystal composition, which has been separately applied onto a support. By heating the liquid crystal composition applied, the liquid crystal molecules are aligned. In the formation of the cholesteric liquid crystal layer, the liquid crystal molecules are preferably aligned in a cholesteric manner, and in the formation of the ¼ wavelength plate, the liquid crystal molecules are preferably aligned in a nematic manner. In the cholesteric alignment, the heating temperature is preferably equal to or lower than 200° C., and more preferably equal to or lower than 130° C. By this alignment, an optical thin film is obtained in which the polymerizable liquid crystal compound is aligned in a twisted manner to have a helical axis in a direction substantially perpendicular to the surface of the film. In the nematic alignment, the heating temperature is preferably 50° C. to 120° C., and more preferably 60° C. to 100° C.

The aligned liquid crystal compound can be further subjected to polymerization so as to cure the liquid crystal composition. The polymerization may be any one of thermal polymerization and photopolymerization using light irradiation, but is preferably photopolymerization. Ultraviolet rays are preferably used for light irradiation. The irradiation energy is preferably 20 mJ/cm$^2$ to 50 J/cm$^2$, and more preferably 100 mJ/cm$^2$ to 1,500 mJ/cm$^2$. In order to accelerate the photopolymerization reaction, the light irradiation may be performed under heating conditions or in a nitrogen atmosphere. The wavelength of the ultraviolet rays for irradiation is preferably 350 nm to 430 nm. From the viewpoint of stability, the rate of the polymerization reaction is preferably high. The rate of the polymerization reaction is preferably equal to or higher than 70%, and more preferably equal to or higher than 80%. The rate of the polymerization reaction can be determined by measuring the consumption rate of polymerizable functional groups by using an IR absorption spectrum.

The thickness of each cholesteric liquid crystal layer is not particularly limited as long as it is in such a range that the above-described characteristics are exhibited. The thickness is preferably in a range of 1.0 μm to 150 μm, and more preferably in a range of 4.0 μm to 100 μm. In addition, the thickness of the ¼ wavelength plate formed from the liquid crystal composition is not particularly limited, but may be preferably 0.2 to 10 μm, and more preferably 0.5 to 2.0 μm.

Temporary Support, Support, and Alignment Layer

The liquid crystal composition may be coated on a surface of a temporary support or an alignment layer formed on the surface of the temporary support to form a layer. The temporary support, or the temporary support and the alignment layer may be peeled off after the formation of the layer.

Particularly, when the ¼ wavelength plate is formed, a support may be used. The support may not be peeled off after the formation of the layer. Examples of the temporary support and the support include polyester such as polyethylene terephthalate (PET), polycarbonate, an acrylic resin, an epoxy resin, polyurethane, polyamide, polyolefin, a cellulose derivative, silicone, and a glass plate. The temporary support may be peeled off after, for example, the adhesion of the circular polarization reflection layer to the front surface plate. The temporary support may function as a protective film until the circular polarization reflection layer is adhered to the image display device after the adhesion of the circular polarization reflection layer to the front surface plate.

The alignment layer can be provided by means of rubbing of an organic compound (resin such as polyimide, polyvinyl alcohol, polyester, polyarylate, polyamideimide, polyether imide, polyamide, and modified polyamide) such as a polymer, oblique vapor deposition of an inorganic compound, formation of a layer having microgrooves, or accumulation of an organic compound (for example, ω-tricosanoic acid, dioctadecylmethylammonium chloride, or methyl stearate) using a Langmuir-Blodgett method (LB film). Furthermore, an alignment layer may be used which obtains an orientation function by the application of an electric field or a magnetic field or by being irradiated with light.

Particularly, it is preferable that an alignment layer composed of a polymer is rubbed, and then the rubbed surface is coated with the liquid crystal composition. The rubbing can be performed by rubbing the surface of the polymer layer with paper or cloth in a certain direction.

The liquid crystal composition may be coated on a surface of a temporary support or a rubbed surface of a temporary support without providing the alignment layer.

The thickness of the alignment layer is preferably 0.01 to 5 μm, and more preferably 0.05 to 2.0 μm.

Lamination Film of Layers Formed from Polymerizable Liquid Crystal Compound

In the formation of a lamination film consisting of a plurality of cholesteric liquid crystal layers and a lamination film consisting of a ¼ wavelength plate and a plurality of cholesteric liquid crystal layers, a step of directly coating a surface of a ¼ wavelength plate or a front cholesteric liquid crystal layer with a liquid crystal composition containing a polymerizable liquid crystal compound and the like, an alignment step, and a fixing step may be repeated in each case. Otherwise, a ¼ wavelength plate, a cholesteric liquid crystal layer, or a laminate thereof prepared separately may be laminated using an adhesive or the like. However, the former is preferable. The reason for this is that, in general, in a case where an adhesive layer provided to have a film thickness of 0.5 to 10 μm is used, interference unevenness resulting from thickness unevenness of the adhesive layer may be observed, and thus it is preferable that the lamination is performed without using the adhesive layer. In addition, the reason for this is that in a lamination film of cholesteric liquid crystal layers, in a case where a cholesteric liquid crystal layer is formed so as to be in direct contact with a surface of a cholesteric liquid crystal layer formed previously, an alignment direction of liquid crystal molecules on the air interface side of the cholesteric liquid crystal layer formed previously is identical to an alignment direction of liquid crystal molecules on the lower side of the cholesteric liquid crystal layer formed thereon, and the polarization characteristics of the laminate of the cholesteric liquid crystal layers are enhanced.

<Front Surface Plate>

The mirror with an image display function according to the invention may have a front surface plate.

The front surface plate may be flat or curved.

The front surface plate may be in direct contact with the reflection layer or may be directly adhered using an adhesive layer or the like.

The front surface plate is not particularly limited. A glass plate or a plastic plate used to produce a usual mirror can be used as the front surface plate. The front surface plate is preferably transparent in a visible light region. Here, transparent in a visible light region means that the light transmittance in the visible light region is 80% or greater, and preferably 85% or greater. The light transmittance which is used as a measure of transparency can be calculated through a method described in JIS-K7105, including: measuring a total light transmittance and a scattered light quantity using an integrating sphere-type light transmittance measuring device; and subtracting a diffuse transmittance from the total light transmittance. In addition, the front surface plate preferably has small birefringence. For example, the front phase difference may be 20 nm or less, preferably less than 10 nm, and more preferably 5 nm or less. Examples of the plastic film include polyester such as polyethylene terephthalate (PET), polycarbonate, an acrylic resin, an epoxy resin, polyurethane, polyamide, polyolefin, a cellulose derivative, and silicone.

A curved front surface plate can be produced by a plastic processing method such as injection molding. In injection molding, for example, raw material plastic pellets are melted by heat, injected into a mold, and solidified by cooling, and thus a resin product can be obtained.

The thickness of the front surface plate may be approximately 100 μm to 10 mm, preferably 200 μm to 5.0 mm, more preferably 500 μm to 2.0 mm, and even more preferably 500 μm to 1000 μm.

<Adhesive Layer>

The mirror with an image display function according to the invention may include an adhesive layer for adhesion between the reflection layer and the front surface plate, between the image display device and the reflection layer, between ¼ wavelength plate and the linear polarization reflection plate, and between other respective layers. The adhesive layer may be formed from an adhesive.

Adhesives are classified into hot-melt types, thermosetting types, photocurable types, reaction-curable types, and pressure-sensitive types which do not require curing. As the materials of these adhesives, it is possible to use compounds based on acrylate, urethane, urethane acrylate, epoxy, epoxy acrylate, polyolefin, modified olefin, polypropylene, ethylene vinyl alcohol, vinyl chloride, chloroprene rubber, cyanoacrylate, polyamide, polyimide, polystyrene, polyvinyl butyral, or the like. From the viewpoint of workability and productivity, photocuring is preferable as the curing method. From the viewpoint of optical transparency and heat resistance, materials based on acrylate, urethane acrylate, epoxy acrylate, or the like are preferably used.

<Method of Producing Half Mirror>

The half mirror may be produced according to procedures based on the method of manufacturing a reflection layer to be used. A half mirror having a front surface plate may be produced by forming a reflection layer on the front surface plate, or by adhering a separately produced reflection layer to the front surface plate. For example, a cholesteric circular polarization reflection layer, or a ¼ wavelength plate and a cholesteric circular polarization reflection layer formed on a temporary support may be transferred to toe front surface plate to produce a half mirror. For example, a cholesteric liquid crystal layer or a laminate of cholesteric liquid crystal layers can be formed on a temporary support to form a cholesteric circular polarization reflection layer, a surface of the circular polarization reflection layer can be adhered to the front surface plate, and if necessary, the temporary support is peeled off to obtain a half mirror. Otherwise, a ¼ wavelength plate and a cholesteric liquid crystal layer can be sequentially formed on a temporary support to form a laminate of the ¼ wavelength plate and the cholesteric circular polarization reflection layer, a surface of the cholesteric liquid crystal (circular polarization reflection layer) can be adhered to the front surface plate, and if necessary, the temporary support is peeled off to obtain a half mirror.

<<<Method of Manufacturing Mirror with Image Display Function>>>

The mirror with an image display function according to the invention is produced in such a manner that a half mirror including a reflection layer is disposed to be inclined with respect to the surface of the image display portion of the image display device. In a case where the half mirror has a front surface plate, the image display device, the reflection layer, and the front surface plate are disposed in this order. Then, if necessary, the image display device and the half mirror may be integrally formed.

In the manufacturing of the mirror with an image display function, the above positioning may be performed after the inclination angle of the half mirror with respect to the surface of the image display portion is selected in accordance with the use mode such that reflected glare of outside light is reduced and image distortion is thus reduced in a case where the image display portion is observed from the half mirror side. That is, the method of manufacturing the mirror with an image display function may include an inclination angle determining step.

The integral formation of the image display device with the half mirror may be performed through connection in an outer frame or a hinge, or adhesion.

EXAMPLES

Hereinafter, the invention will be described in more detail with reference to examples. The materials, the reagents, the amounts of materials, the proportions thereof, the operations, and the like which will be shown in the following examples can be appropriately modified within a range not departing from the gist of the invention. Accordingly, the scope of the invention is not limited to the following examples.

<Preparation of Coating Liquid>
(Coating Liquid for Forming Cholesteric Liquid Crystal Layer)

A compound 1, a compound 2, a fluorine-based horizontal alignment agent 1, a fluorine-based horizontal alignment agent 2, a chiral agent, a polymerization initiator, and a solvent (methyl ethyl ketone) were mixed to prepare a coating liquid having the following composition.

| | |
|---|---|
| Compound 1 | 80 parts by mass |
| Compound 2 | 20 parts by mass |
| Fluorine-based Horizontal Alignment Agent 1 | 0.1 parts by mass |
| Fluorine-based Horizontal Alignment Agent 2 | 0.007 parts by mass |

Right-Turning Chiral Agent LC756 (manufactured by BASF SE) The amount thereof was adjusted in accordance with a target reflection wavelength.

Polymerization Initiator IRGACURE 819 (manufactured by BASF SE) 3.0 parts by mass Solvent (methyl ethyl ketone) The amount thereof was set such that the concentration of the solute was 30 mass %.

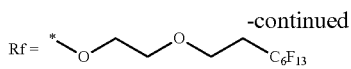

Fluorine-Based Horizontal Alignment Agent 2

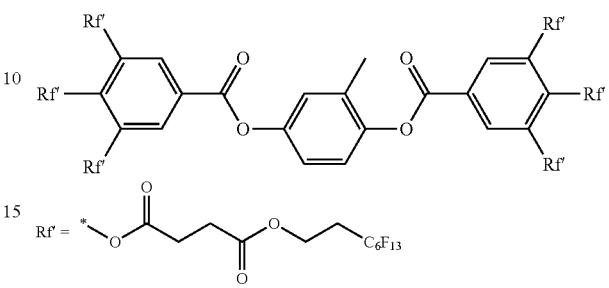

Coating liquids 1 to 3 were prepared by adjusting the prescribed amount of the chiral agent LC-756 in the coating liquid composition. Using each coating liquid, a single cholesteric liquid crystal layer was produced on a temporary support in the same manner as in the following production of a circular polarization reflection layer, and reflection characteristics were confirmed. All of the produced cholesteric liquid crystal layers were right-circular polarization reflection layers, and the central reflection wavelengths were as in the following Table 1.

TABLE 1

| Coating Liquid | Central Reflection Wavelength |
|---|---|
| Coating Liquid 1 | 630 nm |
| Coating Liquid 2 | 540 nm |
| Coating Liquid 3 | 450 nm |

(Coating Liquid for Forming ¼ Wavelength Plate)

A compound 1, a compound 2, a fluorine-based horizontal alignment agent 1, a fluorine-based horizontal alignment

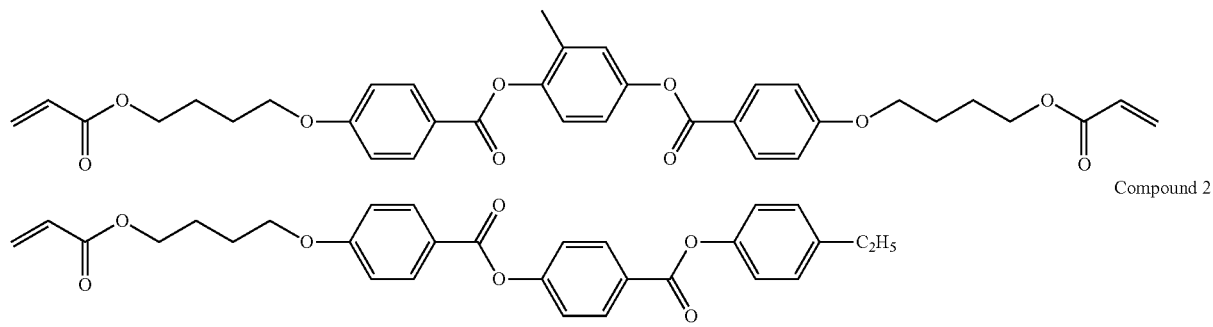

Fluorine-Based Horizontal Alignment Agent 1 agent 2, a chiral agent, a polymerization initiator, and a solvent (methyl ethyl ketone) were mixed to prepare a coating liquid having the following composition.

| | |
|---|---|
| Compound 1 | 80 parts by mass |
| Compound 2 | 20 parts by mass |
| Fluorine-based Horizontal Alignment Agent 1 | 0.1 parts by mass |
| Fluorine-based Horizontal Alignment Agent 2 | 0.007 parts by mass |

Polymerization Initiator IRGACURE 819 (manufactured by BASF SE) 3.0 parts by mass Solvent (methyl ethyl ketone) The amount thereof was set such that the concentration of the solute was 30 mass %.

<Production of Front Surface Plate for Curved Mirror>

A mold (upper and lower molds) was heated to 100° C. and polycarbonate (Panlite AD-5503 manufactured by TEIJIN LIMITED) heated to 310° C. was injected into a space between the upper and lower molds. Fixing was carried out for 1 minute, and a front surface plate for a curved mirror having a vertical width of 65 mm, a horizontal width of 260 mm, and a thickness of 3.0 mm and curved with a radius of curvature of 2000 mm in both long and short sides was obtained.

Examples 1 to 3, 5, and 6

A Pol λ/4 circular polarization reflection layer was produced according to the following procedures.

First, a linear polarization reflection plate was produced based on a method described in JP1997-506837A (JP-H9-506837A). 2,6-polyethylene naphthalate (PEN) and a copolyester (coPEN) of naphthalate (70) and terephthalate (30) were synthesized using an ethylene glycol as a diol in a standard polyester resin synthesis pot. A single layer film of PEN and coPEN was formed by extrusion molding, and then stretched at a stretching ratio of 5:1 at approximately 150° C. The refractive index of PEN associated with an alignment axis was confirmed to be approximately 1.88, the refractive index of PEN associated with a crossing axis was confirmed to be 1.64, and the refractive index of the coPEN film was confirmed to be approximately 1.64.

Next, coextrusion was performed using a 50-slot supply block in which a standard extrusion die was supplied, and thus alternate layers of PEN and coPEN, each having a thickness as shown in (1) of Table 2, were formed. By repeating the above procedures, layers of PEN and coPEN shown in (2) to (5) of Table 2 were formed in order, and the formation of the layers of (1) to (5) was repeated 50 times to laminate total 250 layers. Then, the stretched films were thermally cured for 30 seconds at approximately 230° C. in an air oven to obtain a linear polarization reflection plate (polarization control wavelength range: 400 nm to 650 nm).

TABLE 2

|  | (1) | (2) | (3) | (4) | (5) |
| --- | --- | --- | --- | --- | --- |
| PEN | 63.4 nm | 71.5 nm | 79.6 nm | 87.7 nm | 95.8 nm |
| coPEN | 68.5 nm | 77.2 nm | 86.0 nm | 94.7 nm | 103.5 nm |

PURE-ACE (registered trade name) WR manufactured by TEIJIN LIMITED was used as a ¼ wavelength plate.

The linear polarization reflection plate, the ¼ wavelength plate, and the front surface plate were adhered next to each other in this order using a UV-curable adhesive Exp. U12034-6 manufactured by DIC Corporation, and thus a half mirror of the example was produced. Regarding the front surface plate, in a case of a smooth mirror shown in Table 3, a glass plate (65 mm vertical width×260 mm length, thickness: 3 mm), and in a case of a curved mirror, the above-described front surface plate for a curved mirror was used. In a curved mirror, the linear polarization reflection plate and the ¼ wavelength plate were adhered to the concave curved surface side. In this case, the slow axis of the ¼ wavelength plate was disposed to form an angle of 45° with respect to the transmission axis of the linear polarization reflection plate (polarization direction of light emitted from LCD).

The obtained half mirror was disposed on a surface of an image display portion of a liquid crystal display device (LCD) (manufactured by Apple Inc., iPad (registered trade name) Air) such that the linear polarization reflection plate faced the surface of the image display portion and the front surface plate was on the opposite side (front side). In this case, the transmission axis of the linear polarization reflection plate and the transmission axis of the LCD (polarization direction of light emitted from LCD) were the same.

Further, the half mirror and the LCD were integrally formed at an inclination angle shown in Table 3 to obtain a mirror with an image display function.

Examples 4 and 7

A cholesteric circular polarization reflection plate having a ¼ wavelength plate was produced according to the following procedures.

(1) As a temporary support (150 mm×100 mm), a PET film (COSMOSHINE A4100, thickness: 100 μm) manufactured by TOYOBO CO., LTD. was used, and one surface thereof was rubbed (rayon cloth, pressure: 0.1 kgf (0.98 N), rotation speed: 1000 rpm, transport speed: 10 m/min, number of times: one reciprocation).

(2) The rubbed surface of the PET film was coated with a coating liquid for forming a ¼ wavelength plate using a wire bar. After that, the film was dried, and then put on a hot plate at 30° C. The film was irradiated with UV light for 6 seconds by an electrodeless lamp "D-BULB" (60 mW/cm$^2$) manufactured by HERAEUS to fix the liquid crystal phase, and thus a retardation layer (¼ wavelength plate) having a thickness of 0.8 μm was obtained. A surface of the obtained retardation layer was coated with a coating liquid 1 using a wire bar. Then, the retardation layer was dried, and then put on a hot plate at 30° C. The retardation layer was irradiated with UV light for 6 seconds by an electrodeless lamp "D-BULB" (60 mW/cm$^2$) manufactured by HERAEUS to fix the cholesteric liquid crystal phase, and thus a cholesteric liquid crystal layer having a thickness of 3.5 μm was obtained. On a surface of the obtained cholesteric liquid crystal layer, the same steps were repeated using a coating liquid 2 and a coating liquid 3 in this order, and thus a laminate A of the ¼ wavelength plate and three cholesteric liquid crystal layers (layer of coating liquid 2: 3.0 μm, layer of coating liquid 3: 2.7 μm) was obtained. The transmission spectrum of the laminate A was measured using a spectrophotometer (manufactured by JASCO Corporation, V-670), and a transmission spectrum having a central wavelength of selective reflection at 630 nm, 540 nm, and 450 nm was obtained.

(3) A surface of the cholesteric liquid crystal layer of the laminate A was coated with an adhesive LCR0631 manufactured by TOAGOSEI CO., LTD. using a wire bar, and then bonded to a glass plate using a laminator. In this case, the count of the wire bar and the nip roll pressure of the laminator were adjusted, and the thickness of the adhesive layer was adjusted to 2 μm. Then, the laminate was put on a hot plate at 50° C. and irradiated with UV light for adhesion for 30 seconds by an electrodeless lamp "D-BULB" (60 mW/cm2) manufactured by HERAEUS. Thereafter, the PET film was peeled off and a half mirror was obtained.

The obtained half mirror was disposed on a surface of an image display portion of a liquid crystal display device (LCD) (manufactured by Apple Inc., iPad (registered trade name) Air) such that the ¼ wavelength plate faced the surface of the image display portion and the front surface plate was on the opposite side (front side). In this case, the transmission axis of the ¼ wavelength plate (polarization direction of light emitted from LCD) and the slow axis of the ¼ wavelength plate formed 45°.

Further, the half mirror and the LCD were integrally formed at an inclination angle shown in Table 3 to obtain a mirror with an image display function.

Comparative Examples 1 and 2

Half mirrors produced in the same manner as in Examples 1 to 4 were each formed integrally with a LCD at an inclination angle shown in Table 3 in the same manner as in Examples 1 to 4, and mirrors with an image display function were obtained.

<Evaluation of Mirror with Image Display Function>

The mirrors with an image display function of the examples and the comparative examples which had been produced were evaluated as follows. The results are shown in Table 3.

(Visibility of LCD Image: Image Brightness)

Front luminance during white display of the LCD of the mirror with an image display function was measured using a measuring device (EZ-Contrast 160D, manufactured by ELDIM) in the same manner as in the description in [0180] of JP2009-93166A. "(Front luminance after installation of half mirror/front luminance before installation of half mirror)×100%" was obtained.

(Sunglass Evaluation Tint)

An image of the mirror with an image display function was visually evaluated via polarizing sunglasses. The evaluation was performed based on the following standards.

Good: In a case of displaying a white image, it looks white.

Bad: In a case of displaying a white image, it does not look white (other tins such as yellow and violet).

(Antiglare Effect)

Figure 2:
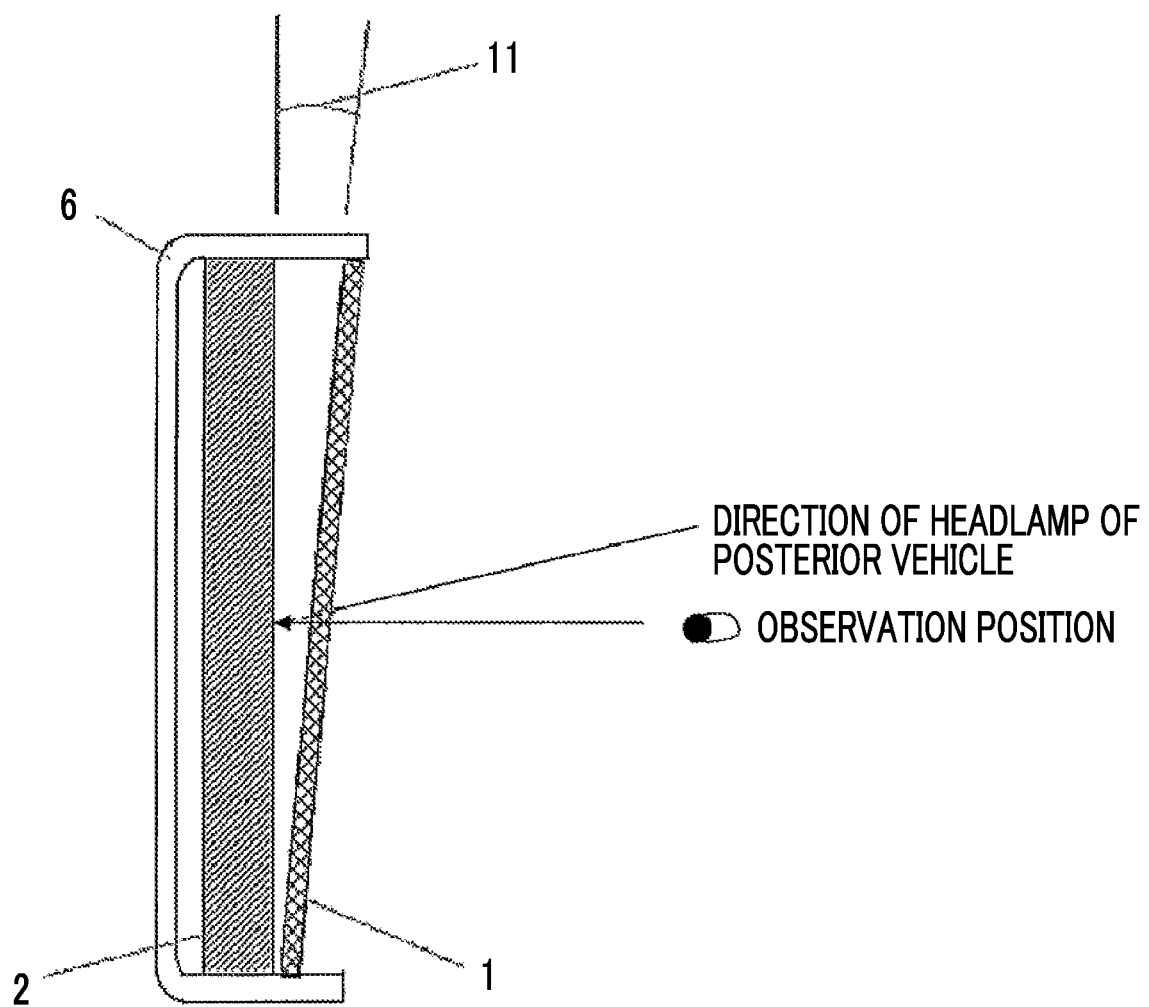
FIG. 2 is a diagram illustrating an observation position during evaluation of a mirror with an image display function produced in an example.

Two vehicles were arranged back and forth such that the headlamp of the posterior vehicle was located posterior to the inner mirror of the anterior vehicle to be separated therefrom by 30 m. The mirror with an image display function produced in the above description was installed at the position of the inner mirror of the anterior vehicle. A driver sat on the seat of the anterior vehicle such that an observation position (evaluator's eye) had a relationship illustrated in FIG. 2 with the mirror with an image display function. The evaluator observed the mirror during irradiation by the headlamp of the posterior vehicle, and confirmed glare.

TABLE 3

| | Circular Polarization Reflection Layer | Mirror Type (radius of curvature) | Inclination Angle between LCD and Reflection Layer | Evaluation Sunglass Evaluation Tint | Antiglare | Visibility of LCD Image (image brightness) |
|---|---|---|---|---|---|---|
| Example 1 | Pol λ/4 | Smooth Mirror | 3° | Good | No Glare | 85% |
| Example 2 | Pol λ/4 | Curved Mirror (2000 mm) | 7° | Good | No Glare | 85% |
| Example 3 | Pol λ/4 | Curved Mirror (2000 mm) | 10° | Good | No Glare | 83% |
| Example 4 | (λ/4+) Cholesteric | Smooth Mirror | 3° | Good | No Glare | 90% |
| Example 5 | Pol λ/4 | Smooth Mirror | 30° | Bad | No Glare | 70% |
| Example 6 | Pol λ/4 | Curved Mirror (2000 mm) | 30° | Bad | No Glare | 70% |
| Example 7 | (λ/4+) Cholesteric | Smooth Mirror | 30° | Bad | No Glare | 75% |
| Comparative Example 1 | Pol λ/4 | Smooth Mirror | 0° | Good | Glare | 85% |
| Comparative Example 2 | Pol λ/4 | Curved Mirror (2000 mm) | 0° | Good | Glare | 85% |

EXPLANATION OF REFERENCES

1: half mirror
2: image display device
6: frame
11: inclination angle

What is claimed is:

1. A vehicle mirror with an image display function comprising:
an image display device; and
a half mirror,
wherein the half mirror includes a reflection layer, and the reflection layer is inclined with respect to a surface of an image display portion of the image display device,
wherein the reflection layer is a circular polarization reflection layer,
wherein the circular polarization reflection layer includes (a) a cholesteric liquid crystal layer or (b) a linear polarization reflection plate and a ¼ wavelength plate, from the image display device side, and
when the circular polarization reflection layer includes a cholesteric liquid crystal layer, the vehicle mirror with an image display function further comprises:
a ¼ wavelength plate,
wherein the vehicle mirror with an image display function includes the image display device, the ¼ wavelength plate, and the circular polarization reflection layer in this order,
wherein the circular polarization reflection layer is a layer in which a cholesteric liquid crystalline phase is fixed,
wherein the vehicle mirror with an image display function is a rearview mirror installed higher than a driver, and
the reflection layer is inclined with respect to the surface of the image display portion of the image display device such that a distance between the reflection layer and the surface of the image display portion of the image display device increases toward an upper part of the half mirror.

2. The vehicle mirror with an image display function according to claim 1,
wherein an inclination angle of the reflection layer with respect to the surface of the image display portion is 3° to 10°.

3. The vehicle mirror with an image display function according to claim 1, when the circular polarization reflection layer includes a cholesteric liquid crystal layer,
the circular polarization reflection layer includes three or more cholesteric liquid crystal layers.

4. The vehicle mirror with an image display function according to claim 1,
wherein the circular polarization reflection layer and the 1/4 wavelength plate are in direct contact with each other.

5. The vehicle mirror with an image display function according to claim 1,
wherein the half mirror includes a front surface plate, and the vehicle mirror with an image display function includes the image display device, the reflection layer, and the front surface plate in this order.

6. The vehicle mirror with an image display function according to claim 1,
wherein an air layer is included between the surface of the image display portion and the half mirror.

7. The vehicle mirror with an image display function according to claim 1,
wherein an adhesive layer is included between the surface of the image display portion and the half mirror.

8. The vehicle mirror with an image display function according to claim 1,
wherein the image display device and the half mirror are integrally formed in a frame provided on side surfaces of the half mirror.

9. The vehicle mirror with an image display function according to claim 1, wherein the image display device is a liquid crystal display device.

* * * * *